United States Patent [19]

Divsalar et al.

[11] Patent Number: 5,644,592
[45] Date of Patent: Jul. 1, 1997

[54] PARALLEL INTERFERENCE CANCELLATION FOR CDMA APPLICATIONS

[75] Inventors: Dariush Divsalar, Pacific Pallisades; Marvin K. Simon, La Canada, both of Calif.; Dan Raphaeli, Tel Aviv, Israel

[73] Assignee: California Institute of Technology, Pasadena, Calif.

[21] Appl. No.: 428,306

[22] Filed: Apr. 24, 1995

[51] Int. Cl.$^6$ .............................. H04B 1/707; H04J 13/04
[52] U.S. Cl. ........................... 375/206; 375/349; 370/479
[58] Field of Search ................................ 375/200, 205, 375/206, 349; 370/18, 320, 335, 342, 441, 479

[56] References Cited

U.S. PATENT DOCUMENTS

| | | | |
|---|---|---|---|
| 3,720,789 | 3/1973 | Clark | 370/18 |
| 4,470,138 | 9/1984 | Gutleber | 375/349 |
| 4,820,993 | 4/1989 | Cohen et al. | 327/156 |
| 5,099,493 | 3/1992 | Zeger et al. | 375/205 |
| 5,218,619 | 6/1993 | Dent | 375/205 |
| 5,363,403 | 11/1994 | Schilling et al. | 375/205 |
| 5,467,368 | 11/1995 | Takeuchi et al. | 375/200 |

OTHER PUBLICATIONS

T. Masamura, "Spread Spectrum Multiple Access System with Intrasystem Interference Cancellation," The Transactions of the IEICE, vol. E71, No. 3, pp. 224–231. Mar. 1988.
"Minimum Probability of Error for Asynchronous Gaussian Multiple-Access Channels," by Sergio Verdu; pp. 85–96; 1986.
"Optimum Multiuser Asymptotic Efficiency," By Sergio Verdu; pp. 890–897; 1986.
"Optimum Detection of Code Division Multiplexed Signals," by Kenneth S. Schneider; pp. 181–185; 1979.
"Linear Multiuser Detectors for Synchronous Code–Division Multiple-Access Channels," by Ruxandra Lupas and Sergio Verdu; pp. 123–136; 1989.

"Near–Far Resistance of Multiuser Detectors in Asynchronous Channels," by Roxandra Lupas and Sergio Verdu; pp. 496–508; 1990.
"Very Low Convolutional Codes For Maximum Theoretical Performance of Spread–Spectrum Multiple Access Channels," by Andrew J. Viterbi; pp. 641–649; 1990.
"Multiusage Detection in Asynchronous Code–Division Multiple-Access Communications," by Mahesh K. Varanasi and Behnaan Aazhang; pp. 509–519; 1990.
"Near–Optimum Detection in Synchronous Code–Division Multiple-Access Systems," by Mahesh K. Varanasi and Behnaam Aazang; pp. 725–736; 1991.
"Multiuser Detectors for Synchronous CDMA Communication Over Non-Selective Rician Fading Channels," by Mahesh K. Varanasi and Subramanian Vasudevan; 1994.
"A Spread–Spectrum Multi-Access System with a Cascade of Co–Channel Interference Cancellers for Multipath Fading Channels," by Young C. Koon, Ryuji Kohno and Hideki Imai; 1992.

(List continued on next page.)

*Primary Examiner*—Stephen Chin
*Assistant Examiner*—Jeffrey W. Gluck
*Attorney, Agent, or Firm*—Michaelson & Wallace

[57] ABSTRACT

The present invention provides a method of decoding a spread spectrum composite signal, the composite signal comprising plural user signals that have been spread with plural respective codes, wherein each coded signal is despread, averaged to produce a signal value, analyzed to produce a tentative decision, respread, summed with other respread signals to produce combined interference signals, the method comprising scaling the combined interference signals with a weighting factor to produce a scaled combined interference signal, scaling the composite signal with the weighting factor to produce a scaled composite signal, scaling the signal value by the complement of the weighting factor to produce a leakage signal, combining the scaled composite signal, the scaled combined interference signal and the leakage signal to produce an estimate of a respective user signal.

35 Claims, 5 Drawing Sheets

OTHER PUBLICATIONS

"A Spread-Spectrum Multiaccess System with Cochannel Interference Cancellation for Multipath Fading Channels," by Young C. Koon, Ryuji Kohno and Hideki Imai; pp. 1067–1075; 1993.

"Advanced CDMA Scheme Based on Interference Cancellation," by M. Kawabe, T. Kato, A. Kawahashi, T. Sato and A. Fukasawa; pp. 448–451; 1993.

"Signal Processing for Wideband Communications," by Vincent Poor; pp. 1–10; 1992.

"Performance Considerations of Code Division Multiple-Access Systems," by Charles L. Weber, Gaylord K. Huth and Bartus H. Batson; pp. 3–10; 1981.

"When Not to Spread-Spectrum—A Sequel," by J. Viterbi; pp. 12–17; 1985.

"Multiple-Symbol Differential Detection of MPSK," by Dariush Divsalaar and Marvin K. Simon; pp. 300–308; 1990.

Yoon et al., Cascaded Co-Channel Interference Cancelling and Diversity Combining for Spread-Spectrum Multi-Access over Multipath Fading Channels, Symposium on Information Theory and its Applications, Sep. 8–11, 1992, pp. 219–221.

PARALLEL INTERFERENCE CANCELLATION FOR CDMA APPLICATIONS

ORIGIN OF THE INVENTION

The invention described herein was made in the performance of work under a NASA contract, and is subject to the provisions of Public Law 96-517 (35 USC 202) in which the Contractor has elected to retain title.

BACKGROUND OF THE INVENTION

1. Technical Field

The present invention relates to an improved method of interference cancellation for use with code division multiple access (CDMA) communication techniques.

2. Background Art

Multiuser communications systems that employ CDMA exhibit a limit on the number of users that can simultaneously communicate over a channel and maintain a specified level of performance per user. This limitation is caused by the domination by other user interference over the additive thermal noise. In general, solutions to this limitation have employed either optimum detection or interference cancellation methods.

One advantageous approach to interference cancellation ("IC") has been the parallel processing of multiuser interference to simultaneously remove from each user the total interference produced by the remaining users accessing the channel as described by, for example, "Cascaded co-channel interference cancelling and diversity combining for spread-spectrum multiaccess over multipath fading channels", by Yoon, Kohno, and Imai, Symposium on Information Theory and its Applications, Sep. 8–11, 1992. This approach allows each user in the system to receive equal treatment in any attempt to completely cancel his multiple user interference. In addition, the delay required to complete a parallel IC operation is only a single bit time, as compared to serial IC methods that require a delay on the order of the number of users multiplied by the bit time as described by, for example, U.S. Pat. No. 5,218,619, issued Jun. 8, 1993 to Paul W. Dent.

Figure 1:
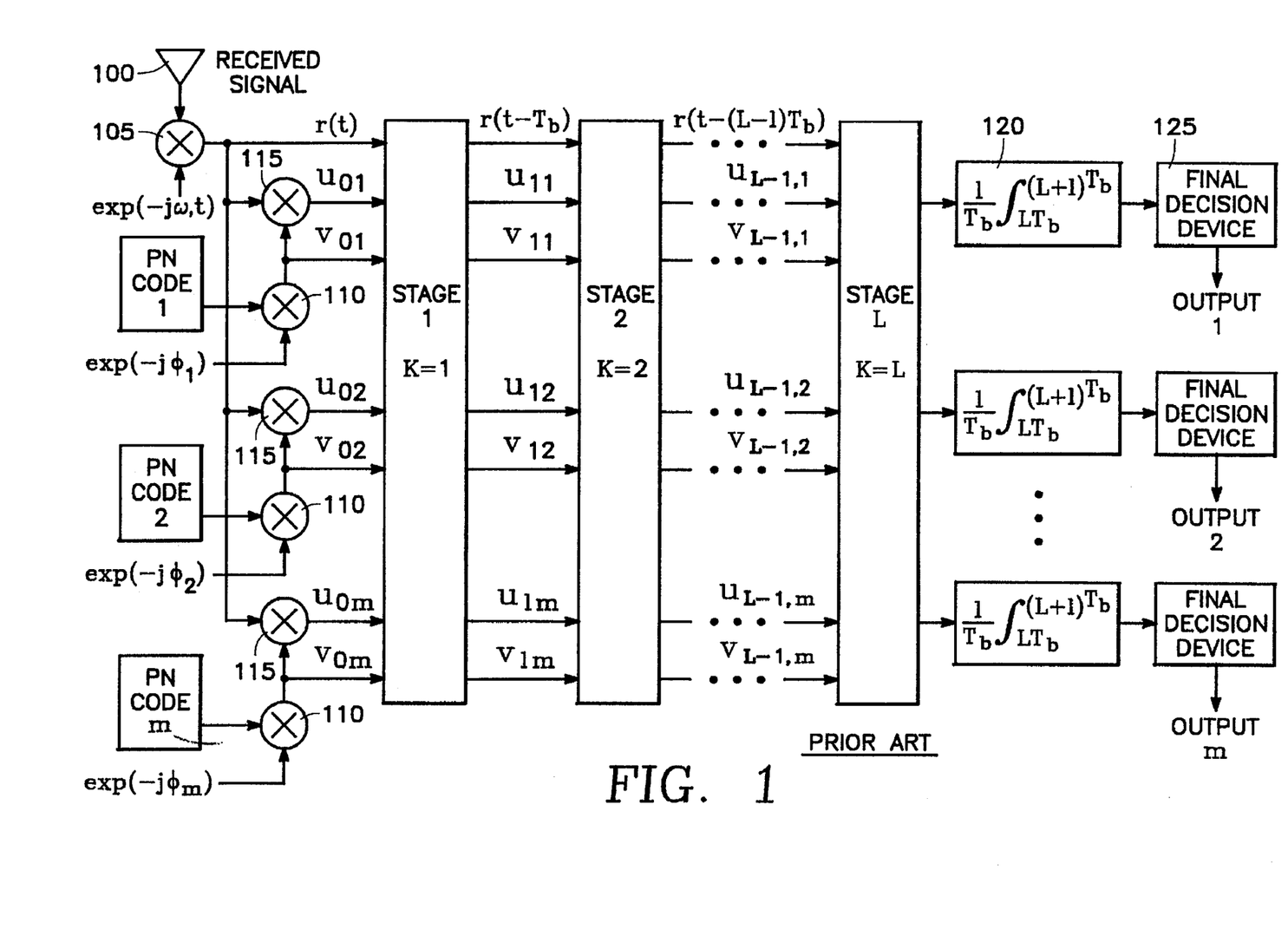
FIG. 1 is a functional schematic of the parallel stages of a prior art IC system.

A complex baseband model of a prior art parallel IC method is shown in FIG. 1 having L cancellation stages, where k is the number of each stage. A composite signal consists of a series of coded signals from users 1 through M, each used to modulate an RF carrier using conventional modulation techniques, such as phase shift keying. Antenna 100 receives the composite signal, from which the complex carrier of frequency ω and zero phase angle is removed by demodulator 105 to produce a baseband signal r(t). For each user m equal to 1 through M, the unique code PN(m) used to modulate the signal in the user transmitter, for example PN1, is mixed by mixer 110 with a carrier phase –φ assigned by the receiver to that user, for example phase –φ1, to form a composite signal v(k,m). Demodulator 115, which is a conventional multiplier, decodes or despreads the signal received from, for example user 1, by multiplying the baseband signal r(t) by the user code, for example PN1. In addition, demodulator 115 demodulates signal r(t) by the carrier phase assigned to this user, for example φ1. The signals used to demodulate are generated by conventional coherent reception methods employing, for example, carrier synchronization loop techniques.

The resulting signal u(k,m) consists of the despread, demodulated signal s(m) received from a user, for example s(1) plus interference signals from all other users that each consists of the user's coded signal multiplied by PN1 and exp(–jφ1). The signals u(k,m) and v(k,m) for each user are then input into the first parallel cancellation stage for which k is equal to 1. As explained previously, each parallel cancellation stage requires only one bit time, or Tb, causing each stage to be delayed by the product of the number of previous stages and Tb.

The outputs of the final stage L, namely the series of signals u(L,m) for each value of m equal to 1 through M are processed by an output filter 120 and a final decision device 125, which is a hard limiter (the use of which is described below).

Figure 2:
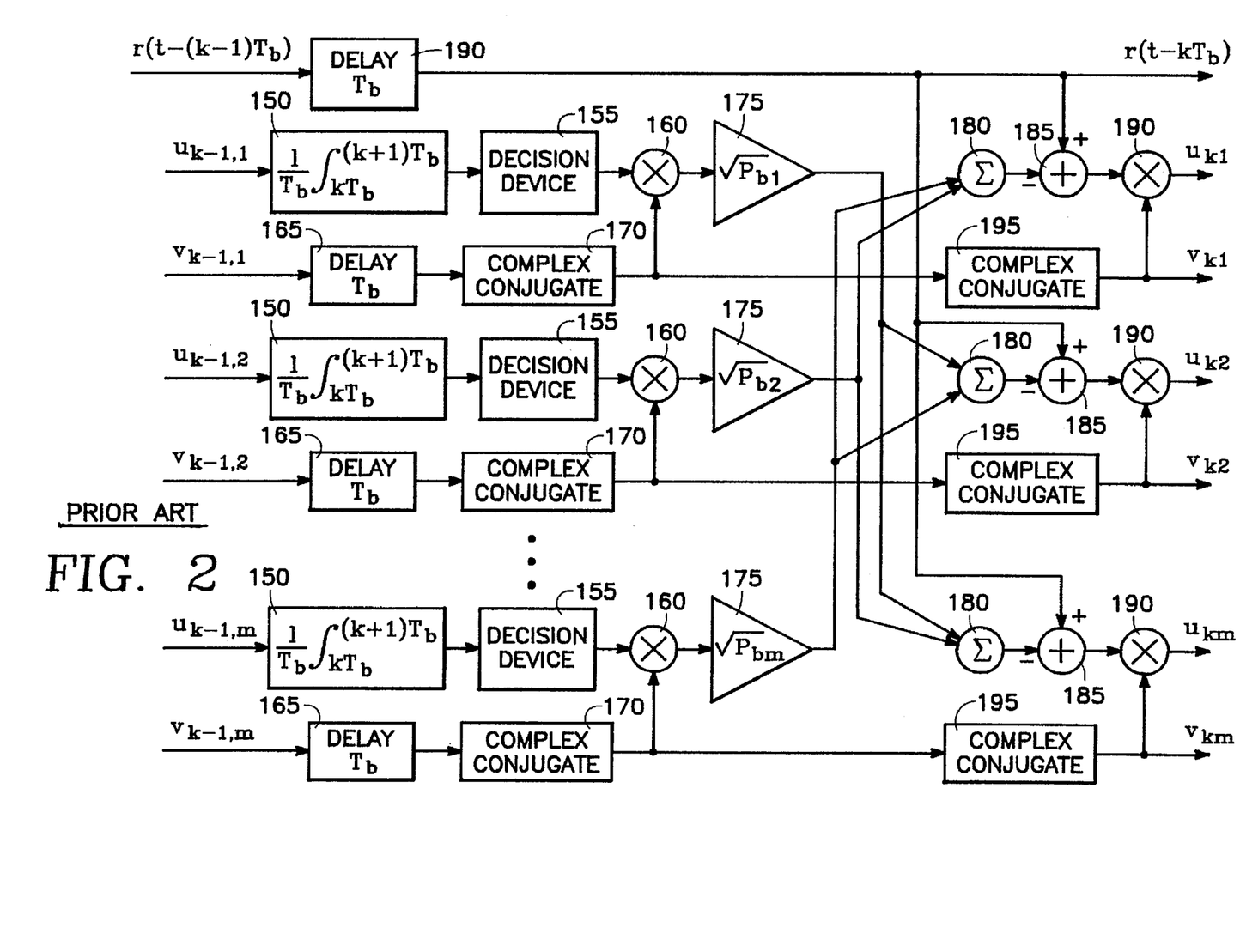
FIG. 2 is a functional schematic of a stage of an IC system, which comprises prior art if the decision device of FIG. 3 is used.
Figure 3:
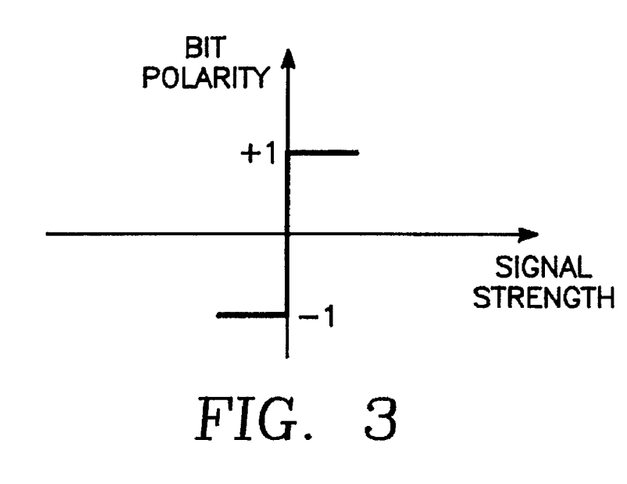
FIG. 3 is a graph of the transfer characteristics of the decision device of the IC system shown in FIG. 1.

Each stage of IC, for example stage k, consists of the processing steps shown in FIG. 2. The signal u(k,m) is processed for each user by a matched filter 150 (for example, an integrate-and-dump circuit for a rectangular pulse shape) to produce a maximum signal-to-noise ratio (SNR) at its output. For example, the signal u(1,1), i.e. for user 1 at the first stage, will be dominated by the user signal s(1) because it is the only user signal that has been despread in the signal u(1,1). The output of matched filter 150 corresponding to u(1,1) is analyzed by a decision device 155 to make a tentative decision concerning the bit polarity of the user signal, for example s(1). In prior art parallel IC systems, the decision device 155 consisted of a hard limiter, or one-bit quantizer, the transfer characteristics of which are shown in FIG. 3, which may be referred to as a hard decision output. For example, if the output of the matched filter 150 is a positive voltage of 0.67, a hard limiter decision device would indicate s(1) has a bit polarity of +1. Thus, if a hard limiter were used as the decision device 155 (shown in FIG. 2), FIG. 2 would represent prior art.

Returning to FIG. 2, the output of the decision device 155 is remodulated and respread by modulator 160, which is a conventional multiplier, with a signal that consists of signal v(k,m) after processing by a time delay circuit 165 and a complex conjugate circuit 170, which produces the conjugate of carrier phase –φ1, i.e. φ1. Thus, except for amplitude, the output of modulator 160 is a recreation of an estimate of the baseband signal transmitted by each user. To complete the recreation of an estimate of s(1), a rescaling amplifier 175 amplifies the signal with an estimate of the transmitted power of s(1).

Estimates of all transmitted signals are simultaneously recreated in the same manner in each stage k. To cancel out other user interference, recreated signals from all users except the one of interest are summed and subtracted from the baseband signal r(t). For example, the recreated signals for users 2 through M are added in a signal summer 180 and subtracted in a baseband summer 185 from the baseband signal r(t), which has been delayed for one bit time Tb by baseband delay circuit 190. The output signal of the baseband summer 185 is then demodulated in output modulator 190 with a signal consisting of the appropriate user code, for example PN1, and the complex conjugate, for example –φ1, of the carrier phase φ used in modulator 160, which is produced by an output complex conjugate circuit 195. The outputs of stage k are, for each user signal, a signal (for example u(k,1)) which is an estimate of the user's transmitted signal and a signal (for example v(k,1)) which is a mixture of the user's code and an assigned user carrier phase.

This method attempts to fully cancel the multiuser interference at each stage L of the IC device. This type of parallel IC processing may be referred to as "brute force" cancellation and has a major shortcoming in that it performs this cancellation operation without regard to the quality of the interference knowledge. In the early stages of IC, the interference estimate may be poor because of low signal-to-interference plus noise ratio, and it may be preferable not to use the estimate to cancel interference. For example, if the transmitted bit polarity is a +1 and if the output of matched filter 150 (as shown in FIG. 2) for user 1 is a small negative value such as −0.4, the decision device shown in FIG. 3 may mistakenly indicate a −1 bit polarity. This effectively adds interference in the IC method rather than removing it. In addition, brute force cancellation fails to take advantage of the fact that as the IC operation progresses by stages, the estimates of the multiuser interference improve and should be given more weight in later stages.

SUMMARY OF THE INVENTION

The present invention comprises a parallel IC system that reduces the degrading effect of multiuser interference and exhibits improved performance over the previously considered parallel IC techniques. The amount of interference actually removed at each stage of the IC operation depends on the quality of the estimates of the interference itself. By not using an IC technique in which removal of the total interference is attempted at each stage of IC operation, the IC process is controlled in accordance with the quality of the interference knowledge.

DETAILED DESCRIPTION OF THE PREFERRED EMBODIMENT

Figure 4:
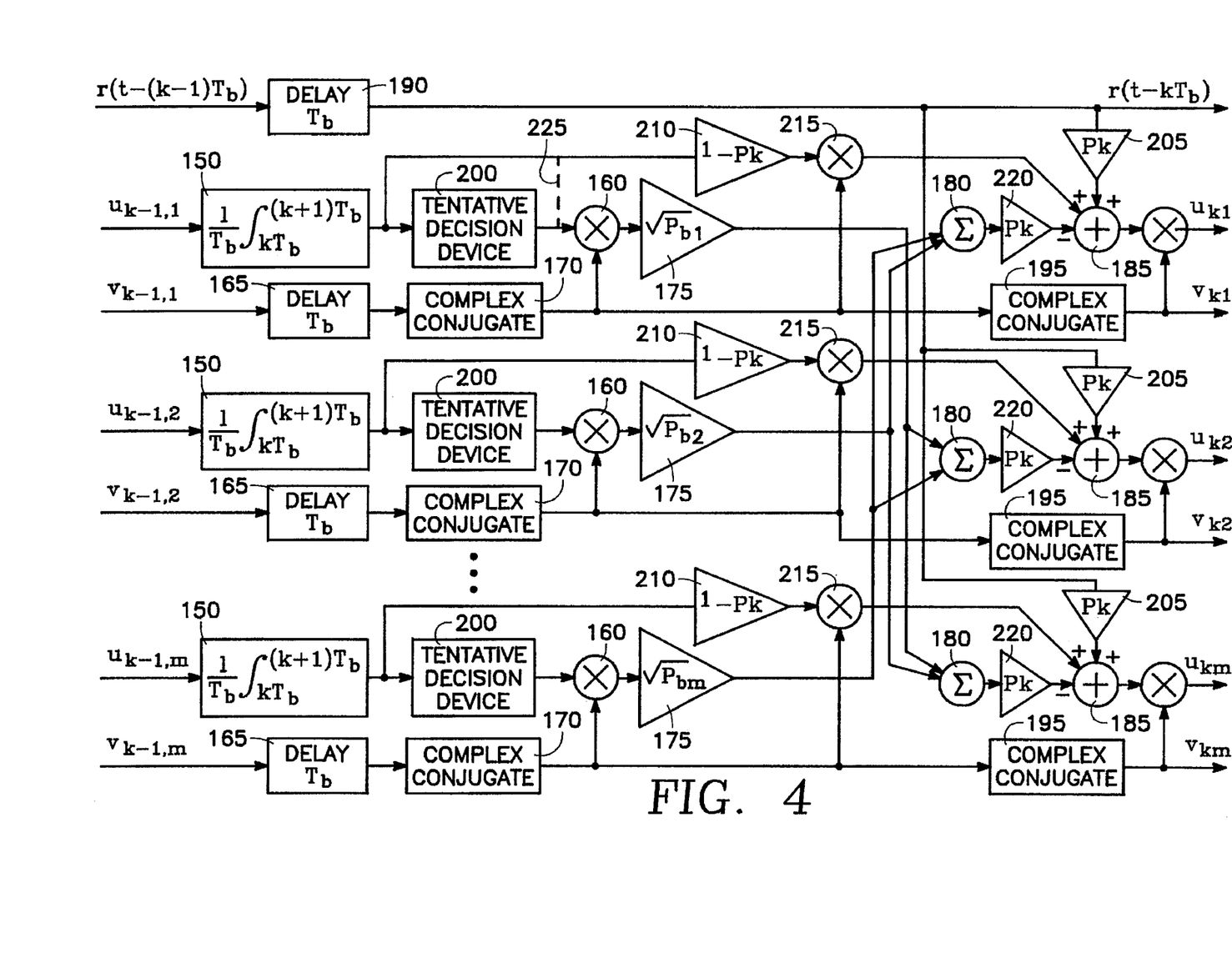
FIG. 4 is a functional schematic of a stage of the IC system of the present invention.

The IC technique of the present invention generally incorporates the structure of IC stages shown in FIG. 1, but differs from the prior art in the steps performed within each stage, as shown in the schematic diagram of FIG. 4.

Tentative Decision Devices

An initial aspect of the invention is to replace the decision device 155 (shown in FIG. 2) with a tentative decision device 200 with transfer characteristics that reduce the cancellation effect of the tentative decisions when the quality of such decisions is poor. Thus, the output of the matched filter 150, i.e. a signal value, is analyzed by a tentative decision device 200 to determine if a decision concerning the polarity of each information bit of the signal s(M) should be made at each stage of the IC process.

Figure 5:
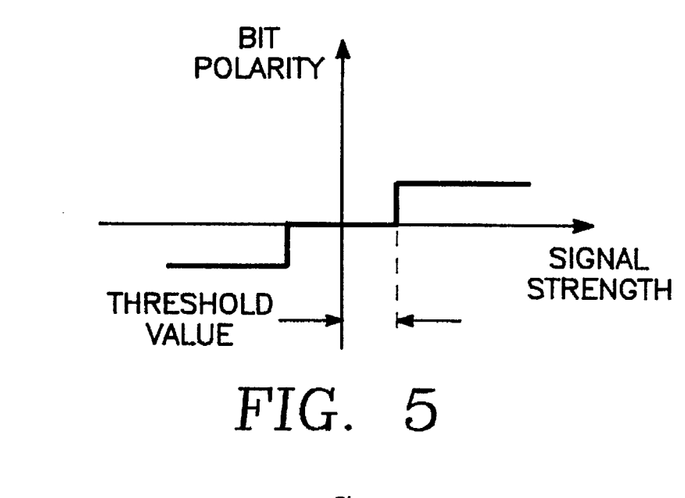
FIG. 5 is a graph of the transfer characteristics of a tentative decision device with a null zone function.

The transfer characteristics of the tentative decision device 200 may be selected to optimally decide whether or not to make a decision concerning the signal information. For example, rather than using the hard limiter decision device of the prior art, a null zone device is used with the transfer characteristics shown in FIG. 5, which does not make a decision concerning the bit polarity unless the signal strength exceeds a threshold value. The reason for this approach is that when a user's signal-to-interference plus noise ratio is low, it is better not to attempt to cancel the interference from that user than to erroneously detect a data bit and thus enhance his interference. For this reason, the threshold value for a null zone device is indirectly related to the user's signal-to-interference ratio and may be optimized at each stage of the scheme.

Figure 6:
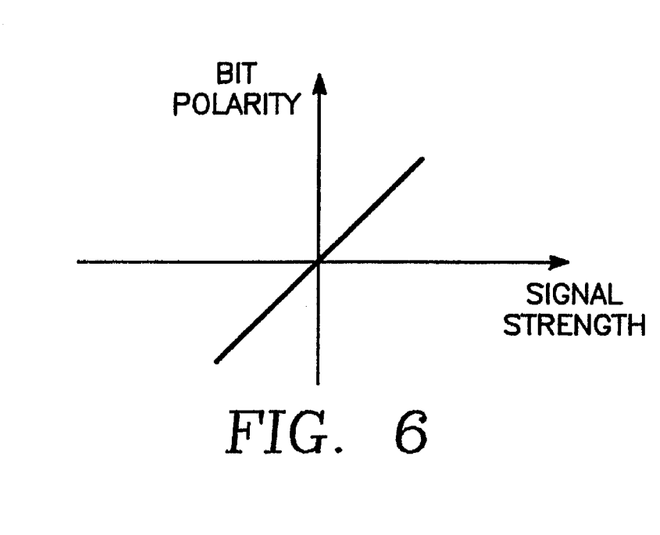
FIG. 6 is a graph of the transfer characteristics of a tentative decision device with a linear function.

One disadvantage of using a hard or null zone limiter for the tentative decision device 200 is that, in order to perform the respreading and remodulating operations in modulator 160, the receiver must have knowledge of each user's power, carrier phase and frequency, and PN code timing, which must be estimated by the receiver, i.e., by using coherent reception. This disadvantage may be overcome by using a tentative decision device 200 with linear transfer characteristics, such as that shown in FIG. 6, which effectively makes no decision concerning the user's bit, which may be referred to as a soft decision output.

Figure 7:
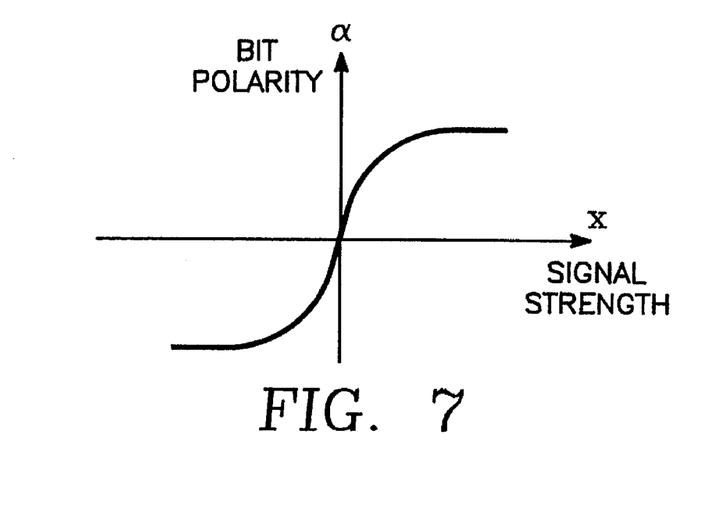
FIG. 7 is a graph of the transfer characteristics of a tentative decision device with a hyperbolic tangent function.

The use of a linear tentative decision device has several advantages in the present invention. Since the signal component of the output of a linear device used as the tentative decision device 200 (shown in FIG. 4) is linearly proportional to the square root of the user's power, the receiver need not estimate these signal powers prior to the cancellation operation and thus, the rescaling amplifier 175 (shown in FIG. 4) would not be needed. Additionally, since there is no need to reconstruct the carrier phases, noncoherent (i.e. differential) detection may be used. Additionally, the combined advantages of the linear tentative decision device and the hard limiter tentative decision device can be achieved with a device having transfer characteristics based on a hyperbolic tangent function tanh $(\alpha,\chi)$ where $\chi$ denotes the input to tentative decision device 200, as shown in FIG. 7. The slope of this device at the origin (i.e. $\alpha$) can be optimized for each stage. Furthermore, for unequal user powers, $\alpha$ can vary from user to user within a given stage.

Partial Interference Cancellation

A second aspect of the invention concerns the use of partial IC at each stage. As described previously, the brute force IC technique shown in FIG. 2 does not result in a receiver with the best performance because it attempts to fully cancel multiuser interference at each stage, including early stages in which the bit data decisions are less reliable. Indeed, the invention only partially cancels the multiuser interference in the early stages, with the amount of cancellation increasing as the IC process iterates towards the final data decisions, i.e., as the quality of the interference estimates improves.

As shown in FIG. 4, a weighting factor p(k) is introduced by the invention to allow for partial cancellation of the multiuser interference at the k th stage. The baseband signal, r(t-(k-1)Tb), is multiplied by p(k) in the signal scaling amplifier 205, which results in, for user 1, the following signal:

p(k)s(1)PN1exp(j$\phi$1)+p(k)s(2)PN2exp(j$\phi$2)+ . . . p(k)s(M)PNMexp(j$\phi$M)

In order to avoid the loss of signal information that would otherwise result at the output of the baseband summer 185 from the tentative decision device 200, a "leakage path" signal for s(1) is created by multiplying the signal output of matched filter 150 by a weighting factor of 1−p(k) in the leakage path amplifier 210. The output of the leakage path amplifier 210 must be remodulated and respread by leakage path modulator 215 to create a leakage path signal compatible with the baseband signal which is, for user 1, as follows:

$$s(1)PN1\exp(j\phi 1)-p(k)s(1)PN1\exp(j\phi 1)$$

Since the baseband signal has been scaled down by p(k) in the signal scaling amplifier 205, the interference cancellation signal from signal summer 180 is also scaled down by the same weighting factor p(k) in the interference cancellation amplifier 220, the signal output of which, for user 1, is the following:

$$p(k)s(2)PN2\exp(j\phi 2)+p(k)s(3)PN3\exp(j3)+\ldots \\ p(k)s(M)PNM\exp(j\phi M)$$

When this signal is subtracted in the baseband summer 185 from the sum of the outputs of the signal scaling amplifier 205 and leakage path modulator 215 (i.e. the previous two signals), the only remaining signal is an estimate of user 1's coded signal, i.e. $s(1)PN1\exp(-j\phi 1)$.

The value of p(k) depends on the stage of the IC process. As more interference is removed at each stage of the parallel IC technique of the invention, the quality of the estimates of the residual interference improves and the value of p(k) increases, i.e. less partial cancellation of the interference estimate is appropriate as IC estimates improve. For example, numerical modeling has shown that appropriate values of p(k) are from 0.5 in early IC stages to 1.0 in later stages, the specific values depending on the number of stages. Furthermore, if the user powers are unequal, then p(k) can vary from user to user within a given stage. It should further be noted that the brute force method of IC shown in FIG. 2 is equivalent to setting p(k) equal to one. Also, a single stage IC method with p(k) equal to zero is equivalent to a conventional CDMA receiver.

In another embodiment of the invention, the leakage path created by the use of leakage path amplifier 210 may be derived from the output of the tentative decision device 200 as shown by dotted line 225 in FIG. 4 rather than the output of filter 150, the latter corresponding to infinitely soft quantized (i.e. linear) tentative decisions.

Although the invention has been described in the context of baseband demodulation in the interest of simplicity, the invention could be implemented using carrier demodulation. In this case, the functions of carrier removal and baseband demodulation would be combined as the function of demodulation by a carrier with an assigned phase angle for each user, e.g., $\phi 1, \phi 2, \ldots \phi M$.

The invention may be used with convolutionally coded modulation, in which case there exist at least two options for handling the tentative decisions made at each stage in the presence of total interference. One option is that these decisions can be made without considering the fact that each user's data is encoded, i.e., treating the data as if it were an uncoded symbol stream. These symbol-by-symbol decisions would then be respread and remodulated directly on the carrier of each user by modulator 160 (shown in FIG. 4). This is the simplest of the two options because the only delay involved is the time (one coded symbol interval) to make these decisions. The second option is to treat the incoming data stream per user as coded symbol streams and make the tentative decisions using a convolutional decoder (soft or hard decision), rather than the tentative decision devices 200 (shown in FIG. 4). In a hard decision output case, the resulting bit stream would be reencoded before respreading and remodulation on the carrier. In the soft decision output case, the decoded signal should be modified to output soft parity bits (encoded bits). Thus, there is no need for reencoding. There is still, however, the need for respreading and remodulation. The second option performs better, but requires a delay on the order of the decoder buffer size.

In carrying out the invention, if the user signal is uncoded, the final decision device 125 (shown in FIG. 1) is a hard limiter. For coded modulation, the final decision device 125 would be linear (soft decision input to the decoder).

When multipath signals are present, the parallel IC method of the invention can be modified by replacing the despreader (mixer 110 and demodulator 115 of FIG. 1) and matched filter 150 (shown in FIG. 4) typical of conventional CDMA receivers with RAKE receivers and including a multipath generator (model of multipath channel) circuit after each respreading operation.

Performance

Figure 8:
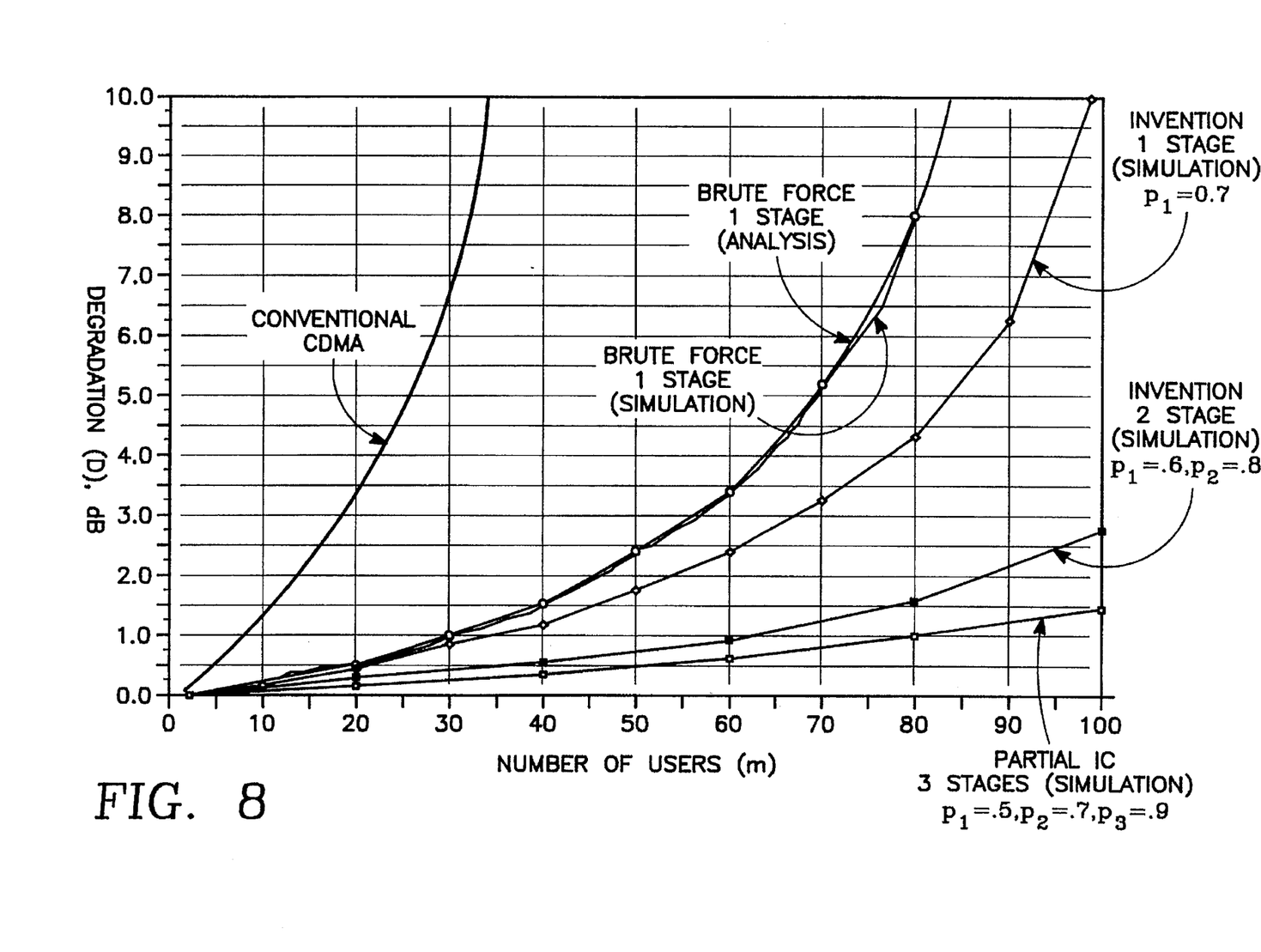
FIG. 8 is a graph of the degradation factor as a function of the number of users for the prior art parallel IC system compared to the IC system of the present invention.

The performance of CDMA systems is typically measured by plotting a degradation factor D (defined as the ratio in dB of the bit energy-to-noise spectral density ratio (Eb/No) required to achieve a given bit error rate in the presence of M users to that which would be required to achieve the same level of performance if only a single user was communicating) versus the number of users, M, for a fixed bit error rate Pb(E) and processing gain η (ratio of code chip rate to data bit rate), for all users. Using a numerical model, the performance of the prior art parallel IC technique, i.e., brute force IC with hard tentative decisions, was compared with that of the parallel IC method of the invention in a plot of D versus M for $Pb(E)=10^{-2}$ and $\eta=100$, as shown in FIG. 8. The degradation (D) for the 2 stages will reach a value of 10 (D=10) when the Number of Users (M) equals a value of 144 (M=144). The degradation (D) for the 3 stages will reach a value of 10 (D=10) when the Number of Users (M) equals a value of 169 (M=144). A dramatic performance improvement is demonstrated by the parallel IC method of the invention.

Although the present invention has been described with reference to preferred embodiments, workers skilled in the art will recognize that changes may be made in form and detail without departing from the spirit and scope of the invention.

What is claimed is:

1. A method of decoding a spread spectrum composite signal, said composite signal comprising plural user signals that have been spread with plural respective codes, wherein each user signal is despread, filtered to produce a signal value, analyzed to produce a tentative decision value, respread, summed with other respread signals to produce combined interference signals, said method comprising:

scaling one of said combined interference signals with a weighting factor to produce a scaled combined interference signal;

scaling said composite signal with said weighting factor to produce a scaled composite signal;

scaling one of said signal value by the complement of said weighting factor to produce a leakage signal; and combining said scaled composite signal with a scaled combined interference signal and a corresponding leakage signal to produce an estimate of a respective user signal.

2. The method of claim 1 wherein said weighting factor has a value in the range of greater than zero and less than one.

3. A method of decoding a spread spectrum composite signal in successive stages, said composite signal comprising plural user signals that have been spread with plural respective codes, wherein in each of said stages each user signal is despread, filtered to produce a signal value, analyzed to produce a tentative decision value, respread, summed with other respread signals to produce combined interference signals, said method carried out in each of said successive stages comprising:

scaling one of said combined interference signals with a weighting factor to produce a scaled combined interference signal;

scaling said composite signal with said weighting factor to produce a scaled composite signal;

scaling one of said signal values by the complement of said weighting factor to produce a leakage signal; and combining said scaled composite signal with a scaled combined interference signal and a corresponding leakage signal to produce an estimate of a respective user signal.

4. The method of claim 3 wherein said weighting factor increases in each of said successive stages so as to reduce the value of said leakage signal in each of said successive stages.

5. The method of claim 4 wherein said weighting factor increases monotonically from a first value of greater than zero in a first one of said successive stages to a last value of less than one, in a last one of said successive stages.

6. A method of decoding a spread spectrum composite signal, said composite signal comprising plural user signals that have been spread with plural respective codes, said method comprising a plurality of interference cancellation steps performed in succession, wherein each step comprises the performance for each one of said user signals of the following substeps:

despreading said composite signal to produce a despread signal corresponding to each user signal;

filtering each despread signal to produce a signal value for each user signal;

analyzing each signal value to produce an information signal for each user signal;

respreading each information signal to produce an interference signal for each user signal;

summing at least the interference signals corresponding to user signals other than said one user signal to produce a combined interference signal;

scaling said combined interference signal with a weighting factor to produce a scaled combined interference signal;

scaling said composite signal with said weighting factor to produce a scaled composite signal;

scaling said signal value by the complement of said weighting factor to produce a leakage signal; and combining said scaled composite signal, said scaled combined interference signal and said leakage signal to produce an estimate of said one user signal.

7. The method of claim 6 wherein said weighting factor increases in each of said successive cancellation steps whereby reducing the value of said leakage signal in each of said successive steps.

8. The method of claim 7 wherein said weighting factor increases monotonically from a first value of greater than zero in a first one of said successive cancellation steps to a last value of less than one, in a last one of said successive cancellation steps.

9. The method of claim 6 wherein said filtering comprises averaging said despread signal over an integration period.

10. The method of claim 9 wherein said integration period comprises an integer number of bit times.

11. The method of claim 10 wherein said integer is one.

12. The method of claim 6 wherein said analyzing comprises processing said signal value by a hard limiting function.

13. The method of claim 6 wherein said analyzing comprises processing said signal value by a linear function.

14. The method of claim 6 wherein said analyzing comprises processing said signal value by a hyperbolic tangent function.

15. The method of claim 6 wherein said analyzing comprises processing said signal value by a null zone function.

16. A method of decoding a spread spectrum composite signal, said composite signal comprising plural user signals that have been spread with plural respective codes, wherein each user signal is despread, filtered to produce a signal value, analyzed to produce a tentative decision value, respread, summed with all other respread signals to produce combined interference signals, comprising:

combining a portion of each signal value with one of said combined interference signals and said composite signal to produce an estimate of a respective user signal whereby to preserve information contained in said user signal.

17. The method of claim 16 wherein said portion comprises the complement of a weighting factor.

18. The method of claim 17 wherein said weighting factor has a value in the range of greater than zero and less than one.

19. The method of claim 16 further wherein said combined interference signals and said composite signal are scaled by a weighting factor prior to said combining.

20. An apparatus for decoding a spread spectrum composite signal, said composite signal comprising plural user signals that have been spread with plural respective codes, wherein each user signal is despread, filtered to produce a signal value, analyzed to produce a tentative decision value, respread, summed with other respread signals to produce combined interference signals, comprising:

means for scaling one of said combined interference signals with a weighting factor to produce a scaled combined interference signal;

means for scaling said composite signal with said weighting factor to produce a scaled composite signal;

means for scaling one of said signal value by the complement of said weighting factor to produce a leakage signal; and means for combining said scaled composite signal with scaled combined interference signal and a corresponding leakage signal to produce an estimate of a respective user signal.

21. The apparatus of claim 20 wherein said weighting factor has a value in the range of greater than zero and less than one.

22. An apparatus for decoding a spread spectrum composite signal in successive stages, said composite signal comprising plural user signals that have been spread with plural respective codes, wherein in each of said stages each user signal is despread, filtered to produce a signal value, analyzed to produce a tentative decision value, respread, summed with other respread signals to produce combined interference signals, each of said successive stages comprising:

means for scaling one of said combined interference signals with a weighting factor to produce a scaled combined interference signal;

means for scaling said composite signal with said weighting factor to produce a scaled composite signal;

means for scaling one of said signal value by the complement of said weighting factor to produce a leakage signal; and means for combining said scaled composite signal with a scaled combined interference signal and a corresponding leakage signal to produce an estimate of a respective user signal.

23. The apparatus of claim 22 wherein said weighting factor increases in each of said successive stages so as to reduce the value of said leakage signal in each of said successive stages.

24. The method of claim 23 wherein said weighting factor increases monotonically from a first value of greater than zero in a first one of said successive stages to a last value of less than one, in a last one of said successive stages.

25. An apparatus for decoding a spread spectrum composite signal, said composite signal comprising plural user signals that have been spread with plural respective codes, said apparatus comprising a plurality of successive interference cancellation stages, wherein each stage comprises for each one of said user signals:

means for despreading said composite signal to produce a despread signal corresponding to each user signal;

means for filtering said despread signal to produce a signal value for each user signal;

means for analyzing each signal value to produce an information signal for each user signal;

means for respreading each information signal to produce an interference signal for each user signal;

means for summing at least the interference signals corresponding to user signals other than said one user signal to produce a combined interference signal;

means for scaling said combined interference signal with a weighting factor to produce a scaled combined interference signal;

means for scaling said composite signal with said weighting factor to produce a scaled composite signal;

means for scaling said signal value by the complement of said weighting factor to produce a leakage signal; and means for combining said scaled composite signal, said scaled combined interference signal and said leakage signal to produce an estimate of said one user signal.

26. The apparatus of claim 25 wherein said weighting factor increases in each of said successive cancellation stages whereby reducing the value of said leakage signal in each of said successive stages.

27. The apparatus of claim 26 wherein said weighting factor increases monotonically from a first value of greater than zero in a first one of said successive cancellation steps to a last value of less than one, in a last one of said successive cancellation steps.

28. The apparatus of claim 25 wherein said filtering means comprises means for averaging said despread signal over an integration period.

29. The apparatus of claim 28 wherein said integration period comprises an integer number of bit times.

30. The apparatus of claim 29 wherein said integer is one.

31. The apparatus of claim 25 wherein said analyzing means comprises means for processing said signal value by a hard limiting function.

32. The apparatus of claim 25 wherein said analyzing means comprises means for processing said signal value by a linear function.

33. The apparatus of claim 25 wherein said analyzing means comprises means for processing said signal value by a hyperbolic function.

34. The apparatus of claim 25 wherein said analyzing means comprises means for processing said signal value by a null zone function.

35. An apparatus for decoding a spread spectrum composite signal, said composite signal comprising plural user signals that have been spread with plural respective codes, wherein each user signal is despread, filtered to produce a signal value, analyzed to produce a tentative decision value, respread, summed with all other respread signals to produce combined interference signals, comprising:

a combiner for combining a portion of each signal value with said combined interference signals and said composite signal to produce an estimate of a respective user signal whereby a portion of information contained in said user signal is preserved.

* * * * *